United States Patent [19]

Gali Mallofre

[11] 4,232,521
[45] Nov. 11, 1980

[54] SYSTEM FOR STARTING INTERNAL COMBUSTION ENGINES

[76] Inventor: Salvador Gali Mallofre, C/Londres, 29-1Q-2a, Barcelona, Spain

[21] Appl. No.: 891,117

[22] Filed: Mar. 28, 1978

[30] Foreign Application Priority Data

Nov. 1, 1977 [ES] Spain .................................. 464.585

[51] Int. Cl.³ ............................................. F02B 37/00
[52] U.S. Cl. ...................................... 60/612; 60/605; 123/562
[58] Field of Search .............. 60/605, 612; 123/119 C, 123/119 CF, 119 CB, 179 F

[56] References Cited

U.S. PATENT DOCUMENTS

| | | | |
|---|---|---|---|
| 1,736,132 | 11/1929 | Rippingille | 123/119 C X |
| 3,427,802 | 2/1969 | Ruoff | 123/179 F X |

FOREIGN PATENT DOCUMENTS 282834  3/1928  United Kingdom .................. 123/179 F

*Primary Examiner*—Michael Koczo
*Attorney, Agent, or Firm*—Wenderoth, Lind & Ponack

[57] ABSTRACT

A system for starting internal combustion engines which increases the kinetic energy of the molecules of air in the interior of the cylinders of the engine by introducing more air molecules from the exterior. Previous to and during starting, the final temperature of the compressed air within the cylinders of the engine is increased by means of an initial precompression of the air within the intake manifold. During the admission of such air into the cylinders of the engine, precompression within the intake manifold is caused by the injection of compressed air from the exterior.

4 Claims, 1 Drawing Figure

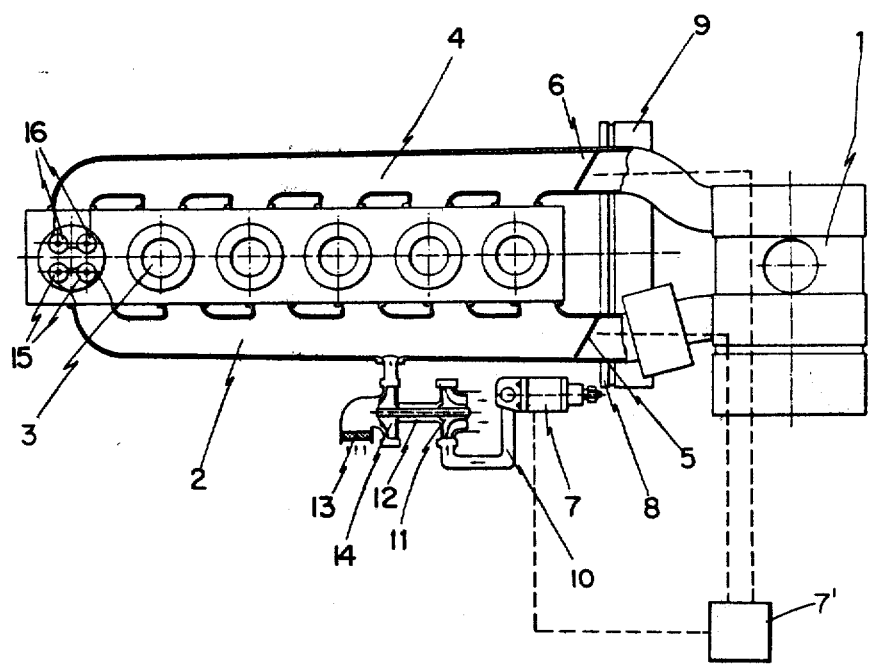

SYSTEM FOR STARTING INTERNAL COMBUSTION ENGINES

BACKGROUND OF THE INVENTION

The present invention is directed to improvements in a supercharging system for starting internal combustion engines which improves the structure and efficiency of systems heretofore used.

In previous internal combustion engines the concern of manufacturers and designers has been to increase the power of the engines. Among the techniques used, the most important is that of supercharging. Supercharging consists of charging a reciprocating internal combustion engine with an increased fuel-air mixture which is greater in quantity than that which can be conventionally suctioned by the engine alone. This supercharging generally can be accomplished by means of compressors which can be driven directly by the engine, with a mechanical coupling, or else by means of a turbine which is activated by the exhaust gases. The power which is obtained from a supercharged engine is considerably higher than that of an engine having a like cylinder capacity which has not been supercharged. The compressors used can be of various types such as volumetric, blade, centrifugal, etc. and having rotational speeds which can reach extremely high levels such as those in the most modern centrifugal type devices. Superchargers are particularly important when applied to aeronautic engines wherein they perform the dual functions of improving the weight/power ratio and reducing losses in power due to decreased atmospheric pressure corresponding to the height at which an airplane travels. Another important use of superchargers is in diesel engines as well as in racing cars.

In spite of the above-described advantages, supercharging of internal combustion engines has been restricted due to the fact that the internal pressure during ignition increases simultaneously as well as the corresponding mechanical and thermal loads on the pistons and support bearings of the various movable parts. To prevent this effect, the supercharging must be accompanied by a correlative reduction in the compression ratio of the engine. This reduction does not pose any problems when the engine is in full operation, since the yield of the compression ratios of the engine and the turbocharger will give the same result as a conventional non-supercharged engine. This reduction in compression ratio of the engine does however, pose serious problems when starting said engines.

In fact, during ignition, the turbocharger which supercharges the engine is inoperative and thus, only the compression ratio of the engine itself can be counted on to start the engine. The engine compression is insufficient by itself to reach the temperature necessary for the ignition of the fuel and the result is that the engine cannot be started.

OBJECT OF THE INVENTION

Thus, the object of the invention is to compensate for the inoperative turbocharger which supercharges the engine by supplying a sufficient pre-compression to allow ignition to occur without difficulty.

SUMMARY OF THE INVENTION

To achieve the described operating conditions, the kinetic energy of the molecules of the air in the interior of the cylinders of the engine is increased by introducing more air molecules from the exterior so that, by compressing this air polytropically, the temperature inside the engine is raised and thus, the final temperature of the air during compression in the engine, when its crankshaft is turned by the action of the starter motor, is correspondingly increased.

In this manner, the final temperature of the compressed air within the cylinders of the engine is achieved previous to and during ignition by means of an initial pre-compression of the air within the intake manifold and in the inlet of the cylinders of the engine. The pre-compression within the intake manifold being produced by injection of compressed air which is taken from the exterior.

Injection of this compressed air from the exterior occurs due to the addition of an independent turbocharger unit which is activated by air being exhausted from a conventional pneumatic starting motor. Thus, the inlet to the drive element of the turbocharger unit is connected to the exhaust nozzle of the pneumatic starting motor while the outlet of the turbocharger unit is connected to the intake manifold of the engine.

In order to obtain a closed cycle during the precompression stage which occurs in the intake manifold of the engine, the cylinders, together with their chamber, and, the exhaust collector, there are provided two valves, one of which, the shutoff valve, is located at the outlet of the exhaust collector, while the other is located at the inlet of the intake manifold for plugging the outlet of the supercharging device. Both valves are controlled by a timer which is itself controlled by the control of the starting motor, so that it operates only during the starting cycle and becomes inoperative during normal operation of the engine.

BRIEF DESCRIPTION OF THE DRAWING

A drawing is attached hereto to complement the description which will follow wherein by way of illustration and not of limitation the following is represented: The FIGURE is a schematic plan view of an internal combustion engine having six cylinders, only one of which shows the position of the intake and exhaust valves; the exhaust collector and the intake manifold, as well as the turbocharger unit, have been sectioned while the primary supercharging device and the pneumatic starting motor have not been sectioned.

DETAILED DESCRIPTION OF THE INVENTION

As can be seen from the described FIGURE, the improvements in the system for starting internal combustion engines are comprised of the coordination and coupling of a supercharging device 1 with the intake manifold 2 which is connected to the cylinders and chambers 3 of an internal combustion engine and to its exhaust manifold or collector 4 through the use of intake valves 15 and the exhaust valves 16. Furthermore, a throttle disc or valve 5 is located on the intake manifold 2 to close the intake, and a throttle disc or valve 6 is located on the exhaust collector 4 to close the exhaust. There is further included a pneumatic starting motor 7 which meshes with a crown gear 8 of flywheel 9 of the engine. Air passes from the exhaust of the starting engine 7 through a collector 10, and a driving element 11 of a turbocharger unit 12. Driving element 11 rotates blades 14 which, through the inlet 13, admits air from the exterior and compresses such air with its blades 14 for injection into the intake manifold 2.

The functioning of the previously described parts is as follows. When the engine is started, the supercharging device 1 is inoperative while the valves 5 and 6, which close the external inlets of the intake manifold 2 and the exhaust collector 4, are activated to form the cycle comprised of the intake manifold 2, the cylinders plus their chamber 3, and the exhaust collector 4. The valves 5 and 6 are controlled and activated by remote timer 7 which in turn is controlled by the starting motor 7.

When the control of the starting motor 7 is activated, the starting motor immediately acts on the toothed gear 8 which is solidly fastened to the flywheel 9 of the engine. The pneumatic starting motor 7, at this time acts through the timer 7' on the valves 5 and 6. The air coming from the collector 10 of the starting motor 7 acts as a source of energy for the driving element 11 of the turbocharger unit 12 which, through its inlet 13, admits air from the exterior, compresses it with its blades 14 and injects it into the interior of the intake manifold 2.

Since more air molecules are taken from the exterior and continuously introduced by injection into the closed cycle created by the valves 5 and 6, the complete and simultaneous operation of elements produces an increase in the kinetic energy of the molecules of air in the interior of the cylinders of the engine.

When the air is compressed polytropically within the cycle, the temperature of the air is raised and thus, the final temperature of the air during compression of the engine is correspondingly further increased when the crankshaft is turned by the action of the starting motor.

The timer, which is schematically shown by 7' which has been activated by the operation of the starting motor act, once the engine is in operation, on the valves 5 and 6, by opening them so that the supercharger 1 is activated and the engine functions under optimum operating conditions. Thus, due to the device of the present invention, the problems created in starting engines of this type, have been overcome.

I claim:

1. A process for starting an internal combustion engine of the type having a flywheel which is turned during starting of said engine, said flywheel being attached to a shaft which is attached to pistons which are located within cylinders in said engine for causing said pistons to reciprocatingly move within said cylinders thereby initiating starting of said engine, an air intake manifold and an exhaust manifold being connected to said cylinders and communicating with said cylinders via intake and exhaust valves for respectively admitting a fuel-air mixture into said cylinders for combustion and for exhausting burned gases which result from combustion, and a turbocharger connected to and communicating with both said exhaust and intake manifolds whereby during normal operation of said engine said burned gases, which are exhausted through said exhaust manifold, drive said turbocharger, said turbocharger compressing said fuel-air mixture entering said cylinders by injecting air from the exterior said process comprising the steps of:

turning said engine flywheel by means of a pneumatic starting motor which has a toothed wheel for turning said engine flywheel during starting and an exhaust conduit for exhausting air which is used to drive said pneumatic starting motor, said pneumatic starting motor adapted for being positioned in relation to said engine for turning said flywheel during starting;

injecting compressed air into said intake manifold for enriching said fuel-air mixture entering said cylinders during starting by means of an auxiliary turbocharging unit including a turbine and a compressor, said auxiliary turbocharging unit being connected to said exhaust conduit of said pneumatic starting motor, said stop of injecting comprising driving said turbine by said air being exhausted from said pneumatic starting motor through said exhaust conduit, thereby driving said compressor connected to said turbine, said compressor communicating with said exterior, drawing air from said exterior into said compressor and compressing said air, and passing the thus compressed air from said compressor into said intake manifold; and closing off communication between said intake and exhaust manifolds and said turbocharger during starting by means of valves positioned at respective ends of said intake and exhaust adjacent said turbocharger, said valves located within said ends of said manifolds and being in a closed position.

2. A process for starting an internal combustion engine as claimed in claim 1, further comprising opening said valves, once said engine has started, by means of a timing mechanism which is controlled by said pneumatic starting motor.

3. A new and improved system for starting a supercharged piston internal combustion engine, whereby the kinetic energy of the molecules of air in the interior of the cylinders of the engine is increased, said engine being of the type including pistons reciprocatingly mounted within cylinders, a shaft which is attached to said pistons for causing said pistons to reciprocatingly move within said cylinders, a flywheel connected to said shaft for initiating starting of said engine, an air intake manifold and an exhaust manifold being connected to said cylinders and communicating with said cylinders via intake and exhaust valves for respectively admitting a fuel-air mixture into said cylinders for combustion and for exhausting burned gases which result from combustion, and a turbocharger connected to and communicating with both said intake and exhaust manifolds, whereby during normal operation of said engine said burned gases which are exhausted through said exhaust manifold drive said turbocharger, said turbocharger serving to compress said fuel-air mixture which enters said cylinders by injecting air from the exterior into said intake manifold, said system comprising:

(a) air driven pneumatic starting motor means having a toothed wheel and adapted for being positioned on an internal combustion engine with said toothed wheel engaging said engine flywheel to turn said flywheel when it is desired to start said engine, said pneumatic starting motor also having an exhaust conduit for exhausting pressurized air which drives said pneumatic starting motor;

(b) auxiliary turbocharging means including a driving turbine, a driven compressor connected to and being turned by said driving turbine, said auxiliary turbocharging means further having air intake means for drawing air in from said exterior and air exhaust means connected to said intake manifold, said auxiliary turbocharging means being connected to said exhaust conduit of said pneumatic starting motor whereby said air being exhausted through said exhaust conduit causes said driving turbine to turn, thereby turning said driven compressor which draws in air from said exterior through said air intake means, compresses said air, and injects it into said intake manifold through said air exhaust means; and (c) closing valve means located at the ends of said intake and exhaust manifolds adjacent said turbocharger and located within said intake and exhaust manifolds for closing off communication of said turbocharger with said intake and exhaust manifolds during starting of said engine.

4. A new and improved system for starting a supercharged internal combustion engine as claimed in claim 3, further comprising timing means which is controlled by said pneumatic starting motor for opening and closing said valve means during starting of said engine.

* * * * *